Nov. 18, 1969  D. M. MAKOW  3,479,588
DISPLACEMENT MEASURING DEVICE INCLUDING A SPACED
FOUR-CORNER ELECTRODE ARRAY
Filed May 12, 1967  3 Sheets-Sheet 2

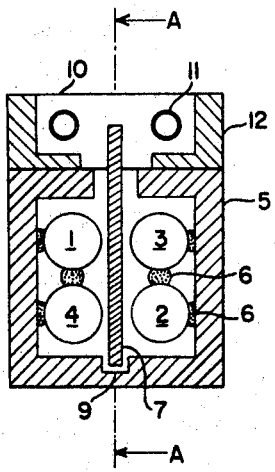
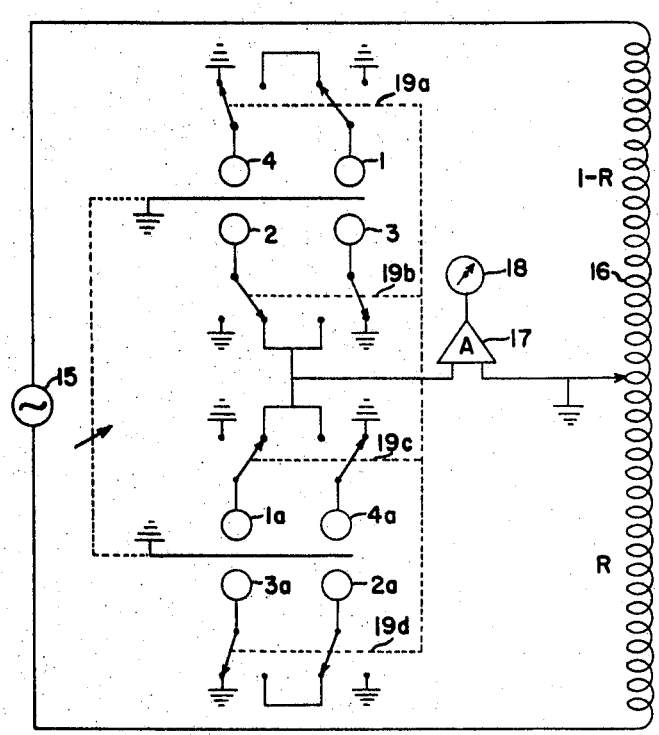
FIG. 1
FIG. 3

INVENTOR
DAVID M. MAKOW
By J. R. Hughes
AGENT

Nov. 18, 1969    D. M. MAKOW    3,479,588
DISPLACEMENT MEASURING DEVICE INCLUDING A SPACED
FOUR-CORNER ELECTRODE ARRAY
Filed May 12, 1967    3 Sheets-Sheet 3

INVENTOR
DAVID M. MAKOW
BY
AGENT

# United States Patent Office 3,479,588
Patented Nov. 18, 1969

3,479,588
DISPLACEMENT MEASURING DEVICE INCLUDING A SPACED FOUR-CORNER ELECTRODE ARRAY
David M. Makow, Ottawa, Ontario, Canada, assignor to Canadian Patents and Development Limited, Ottawa, Ontario, Canada, a corporation of Canada
Filed May 12, 1967, Ser. No. 637,952
Int. Cl. G01r 27/26
U.S. Cl. 324—61                         6 Claims

ABSTRACT OF THE DISCLOSURE

A linear or angular displacement measuring device comprising two sets of at least two extended electrically capacitive electrode structures with each set mounted in fixed, substantially parallel relation, a movable shielding member of predetermined size interposed between the two sets of electrode structures such that when the shield moves in relation to the electrode structures, the electrical capacitance between the said electrodes increases on one set and decreases on the other, and means for measuring the cross-capacitance values of said electrodes, said capacitance values being a function of the displacement of the shield in relation to the said fixed electrode structures.

---

Figure 2:
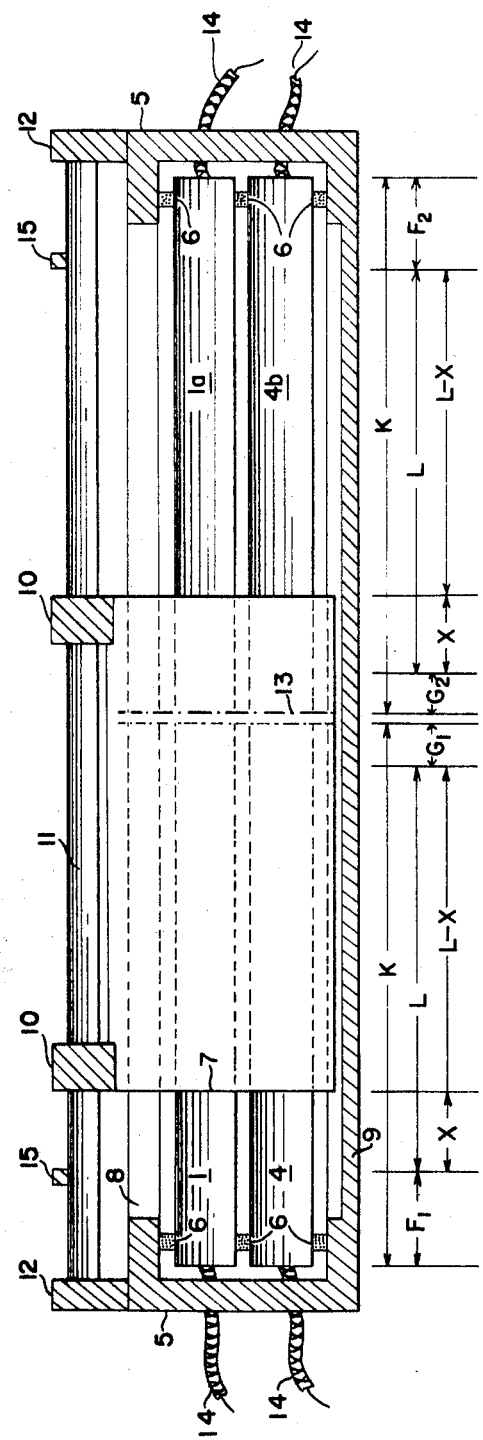

This invention relates to a displacement measuring device and more particularly to an apparatus capable of precise measurement of linear or angular displacement using capacitance ratio.

In a paper entitled "A New Theorem in Electrostatics and Its Application to Calculable Standards of Capacitance," published in Nature, vol. 177, p. 888, May 12, 1956, A. M. Thompson and D. G. Lampard showed that four parallel cylinders form a precise capacitor with useful characteristics. The mean value of the cross-capacitance between opposite cylinders is invariant to the first order with cross-sectional dimensions such as cylinder spacing and diameter and is only a function of length.

It is an object of the invention to provide a displacement measuring device of the capacitance type that will give high accuracy readings without the need for precise construction of the measuring apparatus.

It is another object of the invention to provide a measuring device that is compact, easily installed, and that can be readily adapted to precisely measure the displacement of points that are relatively far apart.

It is another object of the invention to provide a measuring device constructed and operable in such a manner as to take advantage of the Thompson-Lampard Theorem mentioned above.

In its simplest version the invention takes the form of a measuring device comprising two sets of at least two extended electrically capacitive electrode structures with each set mounted in fixed, substantially parallel relation, a movable shielding member of predetermined size interposed between the two sets of electrode structures such that when the shield moves in relation to the electrode structures, the electrical capacitance between the said electrodes increases on one set and decreases on the other, and means for measuring the cross-capacitance values of said electrodes, said capacitance values being a function of the displacement of the shield in relation to the said fixed electrode structures.

In another and much more useful and precise form of the invention, the objects are achieved by a measuring device comprising two sets of four extended electrically capacitive electrodes with each set mounted in fixed parallel relation such that a substantially enclosed central space is formed therebetween, a movable shielding device of predetermined length extending through the sets of four electrodes such that diagonally opposite pairs of said electrodes are electrically shielded from each other over the length of the said shield, said shield and said electrodes being adapted such that the shielded length is increased on one set of four electrodes and decreased on the other set an equal amount when the said shield is moved relative to said electrodes, and means for measuring the cross-capacitance values of said pairs of electrodes at the unshielded positions of said electrodes, said capacitance values being a function of the displacement of the shield relative to the said fixed electrodes.

Figure 4:
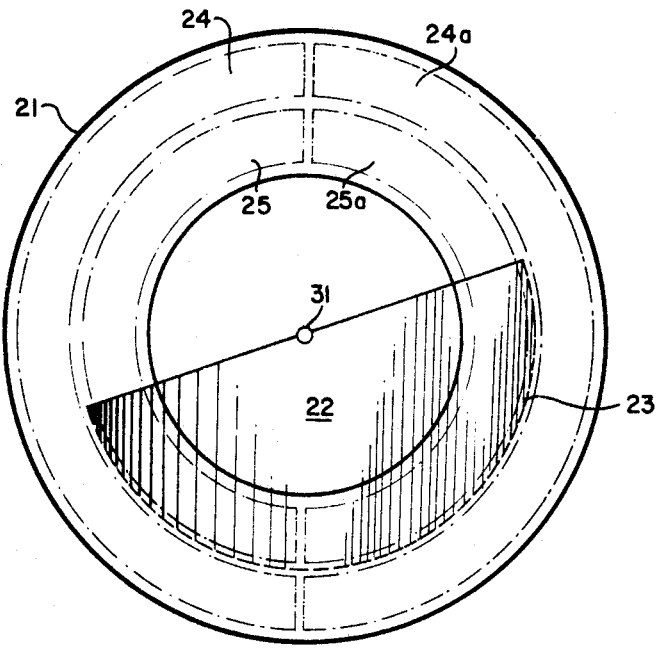
Figure 5:
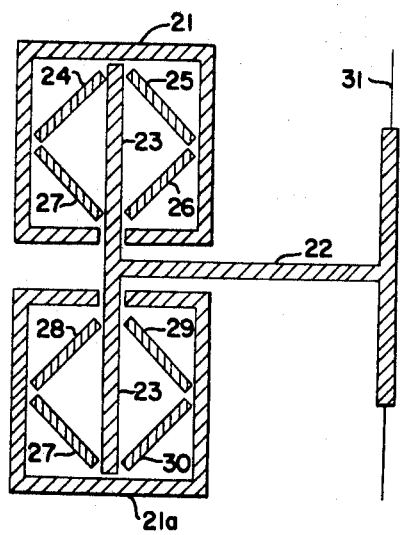

In drawings which illustrate embodiments of the invention,

FIGURE 1 is a cross-section of the measuring device showing four fixed rods in spaced relation and the shield interposed between the rods, FIGURE 2 is a longitudinal cross-section taken on the line A—A of FIGURE 1, FIGURE 3 is a schematic circuit diagram of a suitable measuring bridge for the apparatus, FIGURE 4 is a schematic view of a circular version of the device adapted for measuring circular or angular displacement, and FIGURE 5 is a cross-section of the device of FIGURE 4 showing the form of electrodes for this version of the device.

Referring to FIGURES 1 and 2, four cylindrical rods 1, 2, 3, and 4 are positioned inside a metal container 5 which acts as a shield against stray electric fields that might otherwise affect the capacitance values of the device and thus the accuracy of measurement. The four rods are supported and positioned in parallel, spaced relation by means of insulating spacers 6 such that their axes lie on the corners of a square. It will be noted that the four rods define a substantially enclosed central space with only sufficient spacing between rods to provide electrical insulation and the passage of a shield plate to be discussed below. This close spacing contributes largely to the desired condition that, if an electric field exists between diagonally opposite rods (electrodes), it is almost completely confined to the central space. A shielding plate 7 extends through slot 8 cut in the upper surface of container 5 and extends into a groove 9 cut in the inside surface of the bottom of the container. The shielding plate is connected to upper shield guides 10 which are slidably mounted on rods 11 fixed to end plates 12.

Referring more particularly to FIGURE 2 parallel rods 1 and 4 have electrically conducting outer surfaces but are divided at a central position by an insulating gap 13 into two conducting cylindrical surfaces electrically isolated from each other for each rod, i.e. 1 and 1a, and 4 and 4a, for the two rods appearing in this figure and 3 and 3a, and 2 and 2a, for the other rods as well. Electrical surfaces 1, 1a, 2, 2a, 3, 3a, 4, and 4a are each connected to the exterior by means of suitable electrical leads 14 that would connect to the external bridge circuit to be described below. The parallel rods may be made of sections of steel, copper, or brass tubes mounted on and insulated from metal support rods such as to have the correct spacing and electrical characteristics. An alternative method of forming the rods is by vacuum deposition of metallic vapor on to the surface of quartz or glass rods. This latter method provides rods that are less affected by thermal expansion. In addition, insulating slot 13 can be readily produced by masking techniques. In the case of the metallic rods, temperature expansion effects can be readily compensated for by proper choice of the lengths of the rods and the shield plate. If the ratio of shield length to rod length is made equal to the ratio of the thermal expansion coefficient of the rods to the thermal expansion coefficient of the shield, it can be shown that temperature effects on the measurements are largely compensated for. For example, if the shield is formed of aluminum having a thermal expansion of 28.7 p.p.m./° C. and the rods of steel having a thermal expansion of 14 p.p.m./° C., then it would be desirable to make the ratio of shield length to rod length equal to 14:28.7.

It will be seen that shield plate 7 extends only partially the length of the parallel rods leaving an unshielded portion of rod at each end. The length of travel of the shield is L as fixed by limiting studs 15 and its displacement from the end tatum is designated as X. The length K of the individual conducting cylindrical surfaces, 1, 1a, 2, 2a, etc. is somewhat longer than the shield so as to give extending portions $F_1$, $F_2$, $G_1$, and $G_2$ which are provided so that linearity will not be lost due to end fringing effects. The capacitance obtained between rods over these lengths modifies the output reading by introducing a scaling and additive factor but does not affect the linearity.

FIGURE 3 shows in somewhat schematic form a bridge measuring circuit for the measuring device. As in FIGURE 2, the capacitive portions of the parallel rods are shown as 1, 1a, 2, 2a, 3, 3a, 4, and 4a with the sliding plate 7 which is grounded sliding between in ganged relation to effectively change the capacitive coupling between diagonally opposite rods. As shown in the figure the capacitance between rods 1 and 2 (produced over their unshielded length) designated as $C_1$, and the capacitance between rods 1a and 2a, designated as $C_2$, form two arms of a bridge, the other two arms being provided by the windings of a precision ratio transformer 16 having arms R and 1-R. It is most convenient to use a ratio transformer which is a commercially available device and which has a precision better than 1 p.p.m. The null point of the bridge is obtained by an amplifier 17 and null detector 18 which may incorporate a phase detector. Power for the bridge is provided by a 1000 c.p.s. generator 15 at 100 volts or better. When the bridge is balanced the following relationship holds:

$$R = \frac{C_1}{C_1 + C_2} \qquad (1)$$

Reversing switches 19a, 19b, 19c, and 19d which could be ganged if so desired allow the taking of two separate readings, i.e., from the two sets of pairs of diagonally opposite rods, a feature that allows the taking advantage of the valuable properties of the mean value of the two readings.

In operation the container 5 (see FIGURES 1 and 2) would be fixed to one part of an apparatus and shield guides 10 would be connected to another part of the apparatus, it being understood that the relative displacement of the two parts is what is required to be measured. This relative displacement working from a predetermined datum is indicated as X in FIGURE 2. To measure the distance or displacement X, the voltage values between the exposed (unshielded) portion of the rods (designated as $C_1$ and $C_2$ in FIGURE 3) are applied to the bridge which at balance provides the relationship given by Equation 1 above.

Two cross-capacitance measurements are taken by balancing the bridge with the precision ratio transformer: the first with the cylindrical surface pairs 1 and 2, and 1a and 2a active in the measurement circuit and with the other pairs 3 and 4, and 3a and 4a at ground potential and the second measurement with the potentials interchanged. The mean value of the readings at bridge balance is not only invariant to the first order with cross-sectional diversions of the two parallel rod sets but is also a precise linear function of shield displacement. Invariance to the first order means that if the error of parallel alignment or in the cylindrical shape of the rods is $10^{-3}$, the error in capacitance measurement is proportional not to $10^{-3}$ but to $(10^{-3})^2 = 10^{-6}$. This may be demonstrated as follows:

Assume a small dimensional error $\delta \ll 1$ from ideal symmetry of the two cylindrical surface pairs 1-2 and 3-4 of the first set, and an error $\epsilon \ll 1$ in the second set 1a-2a and 3a-4a. It can be shown that the two cross-capacitance values of the first cylinder set are then given by $$C_{1_{1-2}} = X(C - a\delta + b\delta^2 + \ldots) \qquad (2)$$

$$C_{1_{3-4}} = X(C - a\delta + b\delta^2 + \ldots) \qquad (3)$$

and the two values of the second cylindrical surface pair by $$C_{2_{1a-2a}} = (1-X)(C - a\epsilon + b\epsilon^2 + \ldots) \qquad (4)$$

$$C_{2_{3a-4a}} = (1-X)(C - a\epsilon + b\epsilon^2 + \ldots) \qquad (5)$$

where

X = displacement of the shield
C = cylinder cross-capacitance per unit length when $$\epsilon = \delta = 0 \left( C = \frac{1n^2}{4\P^2} \text{ cm./cm. or } 19.54 \cdot 10^{-15} \text{ farad/cm.} \right)$$

a, b, c = constants

The readings at bridge balance for the two measurements ($R_1$ and $R_2$) are given by $$R_1 = \frac{C_{1_{1-2}}}{C_{1_{1-2}} + C_{2_{1a-2a}}} \qquad (6)$$

$$R_2 = \frac{C_{1_{3-4}}}{C_{1_{3-4}} + C_{2_{3a-4a}}} \qquad (7)$$

The expressions given by Equations 2, 3, 4, and 5 are substituted in Equations 6 and 7 and the second order and higher terms in $\delta$ and $\epsilon$ are neglected. It is found then that all first order terms in $\delta$ and $\epsilon$ cancel out and the mean value of the readings is equal to shield displacement X.

$$\frac{R_1 + R_2}{2} = X \qquad (8)$$

For a linear displacement measuring device as described above it is most convenient from the fabrication point of view of use cylinders as the capacitance devices. It should be pointed out that flat or other forms of surfaces might be used provided they meet the necessary electrical and physical requirements. For a circular version of the device, for measuring angular displacement, it is easier to construct the device using flat electrode surfaces. FIGURE 4 shows in schematic form a possible form of angular displacement measuring device. An annular shielding container 21 is positioned in fixed relation with center "0." A semicircular disc 22 rotating on point "0" carries a half-cylindrical shield member 23 that rotates inside the containers 21 and 21a (see FIGURE 5) and between capacitance electrodes 24, 25, 26, and 27 and also 28, 29, 30, and 31. These electrodes are formed as flat, ribbon-like structures and extend about the central axis "0" as rings in the form of sections of a core. These electrodes are electrically discontinuous at gaps 32 and 33 such that a second set of electrodes 28a, 29a, 30a, and 31a is formed. For measurements less than 180°, only the upper electrode structure set of FIGURE 5 would be necessary. To make a device that could measure completely many times over 360°, a second set of electrodes (the lower set of FIGURE 5) could be added. These would be designed to operate 90° out of place with the other set to complete the 180° and go beyond as required. This second set would have gaps (not shown) at positions 90° rotated from the gaps in the upper set of electrodes.

A simpler version of the device can be constructed using only two rods or flat plates in each set of electrodes instead of four with the shield moving between the two electrodes in each set. The capacitance measurements would be taken as described above but it would not be possible to use the very valuable feature of taking the mean value of two readings.

What is claimed is:
1. A displacement measuring device comprising:
   (a) two sets of four extended, electrically capacitive, electrodes with each set of electrodes arranged in a spaced four corner array,
   (b) electrode mounting means for mounting and positioning said sets adjacent each other such that one pair of electrodes from one set and one pair of electrodes from the other set are arranged opposite their respective other remaining pairs of electrodes and forming a substantially enclosed central space between the one pairs of electrodes and the other pairs of electrodes,
   (c) shield mounting means positioned in relation to said electrodes,
   (d) a movable shielding device of predetermined length movably mounted on said shield mounting means and extending through the sets of four electrodes such that diagonally opposite pairs of said electrodes are electrically shielded from each other over the length of the shield,
   (e) said shielding device being mounted in relation to said electrodes such that the shielded length is increased on one set of four electrodes and decreased on the other set an equal amount when the said shield is moved relative to the said electrodes, and
   (f) means for measuring the cross-capacitance values of said pairs of diagonally opposite electrodes at the unshielded positions of said electrodes, said capacitance values being a function of the displacement of the shield relative to the said fixed electrodes.
2. A displacement measuring device as in claim 1 wherein the means for measuring the cross-capacitance values is a bridge circuit wherein the capacitance ratio of the capacitance values measured at the unshielded portions of the pairs of said electrodes is employed.
3. A displacement measuring device as in claim 4 wherein the bridge circuit includes a ratio transformer as the capacitance ratio measuring device.
4. A displacement measuring device as in claim 1 wherein the two sets of four electrodes are cylinders, said cylinders being mounted in parallel relation such that their center-lines lie on the corners of a square.
5. A displacement measuring device as in claim 1 wherein the electrode structures are shielded from external electrical fields by an enclosing shielding container.
6. A displacement measuring device as in claim 1 wherein the two sets of four electrodes are formed as annuli and the shielding device is rotatably mounted on a central axis such that the device is adapted to measure angular displacement.

References Cited

UNITED STATES PATENTS

| 2,892,152 | 6/1959 | Buisson | 324—61 |
| 3,109,984 | 11/1963 | Mehr | 324—61 XR |
| 3,218,863 | 11/1965 | Calvert | 317—246 XR |
| 3,271,669 | 9/1966 | Lode | 324—61 XR |
| 3,302,459 | 2/1967 | Isoda et al. | 324—61 XR |

FOREIGN PATENTS

| 932,342 | 3/1948 | France. |
| 1,025,712 | 4/1966 | Great Britain. |

EDWARD E. KUBASIEWICZ, Primary Examiner

U.S. Cl. X.R.

317—246